Sept. 1, 1936.   N. A. PALMGREN   2,053,203
RADIAL PLAIN BEARING FOR GREASE LUBRICATION
Filed Sept. 20, 1935

INVENTOR.
Nils Arvid Palmgren
BY
ATTORNEY.

Patented Sept. 1, 1936

2,053,203

UNITED STATES PATENT OFFICE 2,053,203

RADIAL PLAIN BEARING FOR GREASE LUBRICATION

Nils Arvid Palmgren, Goteborg, Sweden, assignor to Aktiebolaget Svenska Kullagerfabriken, Goteborg, Sweden, a corporation of Sweden Application September 20, 1935, Serial No. 41,483
In Sweden October 20, 1934

REISSUED

4 Claims. (Cl. 308—122)

My invention relates to improvements in radial plain bearings for grease lubrication and has for an object to provide within a bearing of this type a reservoir for containing a supply of consistent lubricant and means for automatically circulating such consistent lubricant toward and away from the sliding surfaces of the bearing.

Another object of the invention is to provide a bearing comprising outer and inner bearing rings formed with mating sliding surfaces with a reservoir for containing a supply of consistent lubricant and provided with means contained within the rings for automatically circulating such consistent lubricant from the reservoir to the sliding surfaces within the bearing and from thence to the reservoir.

Another object of the invention is to supply a plain radial bearing with side enclosures fitted in a lubricant proof manner to the outer ring of the bearing and rotatably sealing against parts of the inner ring lying on a smaller diameter than is the diameter of the sliding surface of such inner ring.

Another object of the invention is to provide lubricant channels in the inner ring connecting its sliding surface to the lubricant reservoir, the sides of such sliding surface being in communication with the reservoir.

Modern plain bearings made to comply with hydrodynamic laws have hitherto almost exclusively been designed for oil lubrication. A consistent lubricant, however, offers very important advantages from a practical point of view, partly because a grease of suitable composition simultaneously acts as a lubricant and a protection against the intrusion of foreign particles into the bearing, and partly because a grease does not escape from the bearing housing, if the machine assumes different positions when running.

Grease lubricated bearings have been in use a long time, but the bearing designs have not hitherto admitted the maintenance of fluid friction for any considerable time, without the aid of continually working auxiliary machines for providing a constant supply of lubricant.

The present invention relates to a bearing design rendering possible an automatic circulation of a consistent lubricant in a plain bearing, in that a surplus of grease is constantly supplied to the sliding surface from a grease chamber and reconveyed to this chamber after having lubricated the sliding surface. The bearing comprises substantially an inner bearing ring, provided with a sliding surface on the outside, an outer bearing ring, on the inside of which is a sliding surface fitting the inner ring, and side discs fitted in a lubricant proof manner to the outer ring and rotatably sealing against parts of the inner ring which lie on a considerably smaller diameter than the sliding surface of the inner ring, whereby the side discs and bearing rings are designed to form closure members for the lubricant, and lubricant channels are provided in the inner ring which connect the sliding surface to the closure members.

The invention is illustrated in the accompanying drawing, in which

Figure 1:
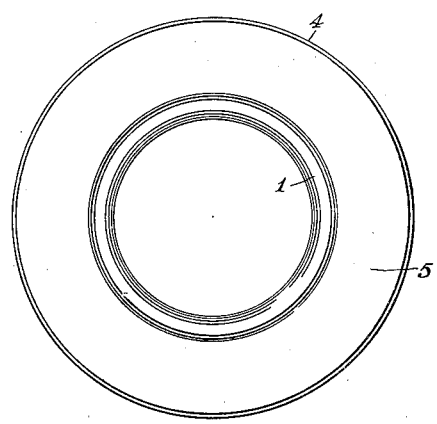
Figure 1 is a side view of a radial plain bearing for grease lubrication according to one embodiment of the invention.
Figure 2:
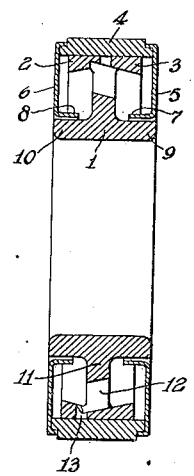
Figure 2 is a sectional view of the same bearing in an axial plane.

In Figures 1 and 2 the inner ring 1 is shown of relatively high I-form in cross section. On the outside of the outer flanges 2 and 3 of the inner ring is a cylindrical sliding surface. To this sliding surface fits a corresponding sliding surface, formed on the inside of the outer ring 4. On the outer ring 4, two closure members 5, 6 are applied in such a manner that the lubricant cannot pass between the members and the outer ring. The members 5, 6, extend inwardly towards the bearing center and have flanges 7, 8, which form movable seals against the outside of the inner flanges 9, 10 of the inner ring, there being a narrow space between the flanges 7, 8, of the closure members and the flanges 9, 10, of the inner ring.

In the web 11 of the inner ring a number of holes 12 are formed, and holes 13 in the outer flange of the inner ring lead from the holes 12 to the sliding surface. The closure members which are of annular cup form with the bottoms outwards form a tight chamber or reservoir around the bearing rings, which in practice is filled with grease. This chamber communicates with the sliding surface through holes 12, 13 in the inner ring, and with the sides of the sliding surface for supply and exhaust respectively.

The grease chamber or reservoir enclosed between bearing rings and side discs is of annular form and is located nearer the bearing center than is the sliding surface. The rotation of the inner ring causes part of the grease to follow the rotation of the ring and thereby to be pressed out through the holes 13 by the centrifugal force to the narrow space between the inner and outer ring, where a load carrying lubricant film is formed according to the hydrodynamic laws. Owing to the pressure in this film, the grease is gradually pressed out against the sides and returns automatically to the grease containing chamber. The grease will consequently automatically circulate under the action of the centrifugal force and the bearing pressure, without ever having to leave the bearing.

Figure 3:
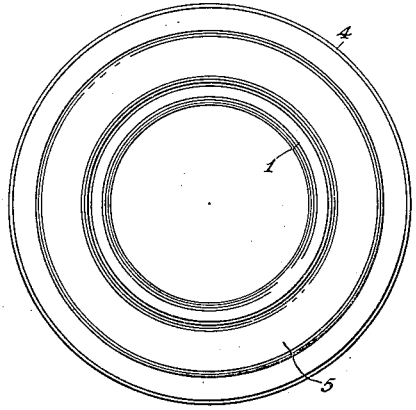
Figure 3 is a side view of a bearing according to another embodiment of the invention.
Figure 4:
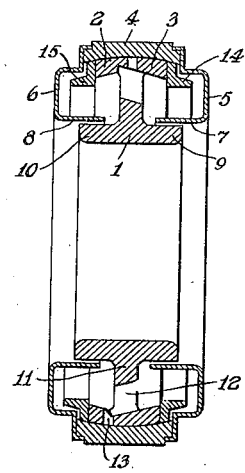
Figure 4 is a section in an axial plane of the bearing according to Figure 3.

The bearing according to Figs. 3 and 4 is designed in practically the same manner as the bearing described above. The sliding surface on the outside of the inner ring 1 is however, spherical and fits into a corresponding surface on the inside of the outer ring 4. The bearing is thereby self-aligning. The side discs 5, 6, are designed as deeper cups of annular form, so that the axial width from the bottom of one side disc to the bottom of the other side disc is greater than the axial width of the bearing rings. By this means a considerably larger supply of lubricant is assured in the bearing.

In the bearing according to Figures 3 and 4, plane thrust taking sliding surfaces are provided along the sides of the outer flanges 2, 3. They bear against pressure rings 14, 15, which are supported by the spherical sliding surface of the outer ring 4. These rings are located inside the grease closure and do not disturb the desired grease circulation.

Having thus described my invention, I claim and desire to secure by Letters Patent:

1. A radial plain bearing for grease lubrication comprising an inner bearing ring having a sliding surface on its outer periphery, an outer bearing ring having a sliding surface on its inner periphery fitting the surface of the inner ring, and closure members located on each side of the bearing, sealingly fixed to the outer ring and movably sealing against portions of the inner ring which lie on a substantially smaller diameter than the sliding surface of the inner ring, the closure members forming a closed reservoir chamber presenting annular chambers communicating on both sides with the space between the sliding surfaces, the parts forming annular chambers, channels or the like located laterally of the inner ring, there being grease channels formed in the inner ring extending from the reservoir chamber to the sliding surface and opening at the sliding surface intermediate of the ends thereof for throwing the grease by centrifugal force to the sliding surface whence it is moved by bearing pressure back to the reservoir, in order to cause a continual circulation of the lubricant within the bearing.

2. A radial plain bearing according to claim 1, characterized thereby that the inner ring is of I-section and that the closure members seal against the outside of the inner flanges thereof.

3. A radial plain bearing according to claim 1, characterized thereby that the closure members consist of annular lubricant proof cups, the bottoms of which are turned outwardly from the middle plane of the bearing.

4. A radial plain bearing for grease lubrication comprising an inner bearing ring having a sliding surface on its outer periphery, an outer bearing ring having a sliding surface on its inner periphery fitting the surface of the inner ring, and closure members located on each side of the bearing, sealingly fixed to the outer ring and movably sealing against portions of the inner ring which lie on a substantially smaller diameter than the sliding surface of the inner ring, the closure members forming a closed reservoir chamber presenting annular chambers communicating on both sides with the space between the sliding surfaces, the parts forming annular chambers, channels or the like located laterally of the inner ring, there being grease channels formed in the inner ring extending from the reservoir chamber to the sliding surface and opening at the sliding surface intermediate of the ends thereof for throwing the grease by centrifugal force to the sliding surface whence it is moved by bearing pressure back to the reservoir, in order to cause a continual circulation of the lubricant within the bearing, the closure members consisting of annular lubricant proof cups the bottoms being turned outwardly from the middle plane of the bearing and the axial width over the bottoms of such members being greater than the axial width of at least one of the bearing rings in order to accommodate an increased supply of lubricant in the bearing.

NILS ARVID PALMGREN.